United States Patent
Rohde et al.

(10) Patent No.: US 8,224,181 B2
(45) Date of Patent: Jul. 17, 2012

(54) PROTECTION DEVICE FOR REMOVING SIGNAL INTERFERENCE IN A PASSIVE OPTICAL NETWORK

(75) Inventors: Harald Rohde, München (DE); Dominic Schupke, München (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 761 days.

(21) Appl. No.: 12/297,797

(22) PCT Filed: Apr. 19, 2007

(86) PCT No.: PCT/EP2007/053860
§ 371 (c)(1),
(2), (4) Date: Dec. 16, 2008

(87) PCT Pub. No.: WO2007/122183
PCT Pub. Date: Nov. 1, 2007

(65) Prior Publication Data
US 2009/0238564 A1    Sep. 24, 2009

(30) Foreign Application Priority Data

Apr. 20, 2006 (DE) .......................... 10 2006 018 431
Apr. 20, 2006 (EP) ..................................... 06008223
Jun. 29, 2006 (DE) .......................... 10 2006 029 967

(51) Int. Cl.
*H04B 10/08* (2006.01)
*H04B 17/00* (2006.01)

(52) U.S. Cl. ................ 398/15; 398/10; 398/22; 398/23; 398/99; 398/71

(58) Field of Classification Search .................. 398/1, 2, 398/8, 9, 10, 12, 15, 17, 19, 22, 23
See application file for complete search history.

(56) References Cited

U.S. PATENT DOCUMENTS

| | | | |
|---|---|---|---|
| RE36,471 E | 12/1999 | Cohen | |
| 6,108,112 A | 8/2000 | Touma | |
| 2004/0156635 A1 | 8/2004 | Felske et al. | |
| 2006/0093356 A1* | 5/2006 | Vereen et al. | 398/33 |
| 2006/0198635 A1* | 9/2006 | Emery et al. | 398/38 |

FOREIGN PATENT DOCUMENTS

| | | |
|---|---|---|
| EP | 0 786 878 A2 | 7/1997 |
| EP | 0786878 | 7/2007 |
| GB | 2 323 490 A | 9/1998 |
| GB | 2323490 | 9/1998 |
| JP | 7231306 A | 8/1995 |
| JP | 07231306 A * | 8/1995 |
| JP | 7303266 A | 11/1995 |
| JP | 9046298 A | 2/1997 |
| JP | 10262000 A | 9/1998 |

OTHER PUBLICATIONS

Machine translation of JP07231306A.*
H. Rohde, "Modern PON Architecture", APOC 2005.

* cited by examiner

*Primary Examiner* — Kenneth N. Vanderpuye
*Assistant Examiner* — Daniel Dobson
(74) *Attorney, Agent, or Firm* — Laurence A. Greenberg; Werner H. Sterner; Ralph E. Locher

(57) ABSTRACT

The invention relates to a protection device for removing signal interference in a passive optical network and to a corresponding passive optical network and to a method for removing signal interference in a passive optical network.

26 Claims, 3 Drawing Sheets

PROTECTION DEVICE FOR REMOVING SIGNAL INTERFERENCE IN A PASSIVE OPTICAL NETWORK

The invention relates to a protection device for removing signal interference in a passive optical network and to a corresponding passive optical network and to a method for removing signal interference in a passive optical network.

The invention relates to the field of passive optical networks. Passive optical networks are networks of optical fiber lines in which optical light signals are transmitted and distributed without interposition of active amplifying components. Such passive optical networks are used, for example, as access networks for distributing broadband data from a public optical fiber network to a plurality of user units also called ONU (Optical Network Unit). In such passive optical networks, the data are exchanged between a so-called OLT (Optical Line Terminal), which represents the access point to the passive optical network, and the individual ONUs. For this purpose, the optical network comprises a branching point which branches a central cable coming from the OLT into a plurality of branching lines, each branching line ending at an ONU. The problem is here that in such an optical network, interference in a single ONU can cause a collapse of the entire access network during a data transmission from the ONUs to the OLT since a disturbed signal coming from an ONU reaches the central cable and there causes a disturbed overall signal which can no longer be processed correctly. When such signal interference occurs in conventional optical networks, the fault must be eliminated by a service technician who examines and individually disconnects the individual branching lines at the branching point of the optical network until the causal fault has been found. This procedure is very time-consuming and leads to a long failure time of the optical network.

It is the object of the invention, therefore, to create a protection device for a passive optical network which eliminates signal interference on branching lines in the optical network automated and within a short time.

This object is achieved by the independent patent claims. Further developments of the invention are defined in the dependent claims.

The protection device according to the invention comprises a plurality of first taps and/or a second tap. In this arrangement, a first tap which is used for tapping off an optical signal flowing in the respective branching line to the central cable is in each case provided in at least some of the branching lines. Furthermore, the second tap is arranged in the central cable and is used for tapping off an optical signal flowing in the central cable in the direction away from the branching point.

The protection device also comprises a plurality of switches, a switch for turning off the respective branching line being provided in each case in at least some of the branching lines and particularly in all branching lines.

The device according to the invention also comprises a control device which is constructed in such a manner that when signal interference occurs in the operation of the passive optical network, a subsequently defined first and second detection, respectively, is carried out. The device according to the invention can perform either one of the two detections or both detections. In the first detection, it is detected whether the optical signal tapped off by the first tap is a digital signal level sequence in the case of temporary disconnection of one or more branching lines, a digital signal level sequence being understood here and in the text which follows to be a sequence of signal levels, the level values of which exclusively comprise a predetermined Low level and a predetermined High level. Should such a digital signal level sequence be detected by the first detection, the corresponding switches in the one or more branching lines temporarily disconnected permanently turn off these branching lines. This makes use of the finding that the disconnected signal lines were causal for an interference signal since a correct digital signal was received when they were turned off.

According to a second detection, the control device according to the invention detects whether the optical signal tapped off by the second tap in a respective branching line is also a digital signal level sequence. If this is not the case, the switch in the respective branching line turns off this branching line. In this manner, the branching line on which interference is present can be determined directly due to the fact that no digital signal can be detected on this line.

Using the protection device according to the invention, interference caused in the branching lines by the subscribers at the end of the branching lines can be detected in a simple manner. In particular, the case can be detected where continuous light is sent into the branching line by an interferer since the signal level never returns to the Low level or zero level in this case and, in consequence, an error is detected. Similarly, those interferers are also detected which send in the time slots which are allocated to regular subscribers since in this case, signals are generated which have more than two levels due to the fact that the interference signal is superimposed on the predetermined High level or One level.

In a preferred embodiment of the device according to the invention, the control device is constructed in such a manner that when the first detection is carried out, individual branching lines and/or combinations of several branching lines are turned off successively for a predetermined period of time. The period of time is preferably 10 ms or less in this case. Such a brief disconnection of the individual branching lines makes it possible to very rapidly determine the branching line or those branching lines which are causal for the interference. These lines can then be disconnected completely after only a brief interruption so that, depending on the type of data traffic, the failure of the connection is not even detected in undisturbed branching lines.

In a further preferred embodiment of the device according to the invention, the control device comprises in at least some of the branching lines in each case a converter device arranged at the second tap which converts light energy of the tapped-off optical signal into electrical voltage for controlling the corresponding switch in the branching line. In this arrangement, the converter device carries out the second detection in such a manner that, in the case where the optical signal tapped off is not a digital signal level sequence, the voltage generated by the converter device assumes a value which causes the switch in the respective branching line to be turned off. This converter device can effect the turning-off of the switch in the respective branching line in a particularly simple manner when the optical signal tapped off is a continuous-light signal. In particular, the converter device can be constructed in a simple manner as passive component which comprises a photodiode and a capacitor which interact in such a manner that the photodiode, when receiving light energy from the tapped-off optical signal, charges the capacitor, the switch being turned off by the charge of the capacitor when the charge of the capacitor is adequate.

The switches used in the branching lines can be arbitrary switches for turning off an optical line, for example, the switches can comprise piezoelectric switches and/or Mach-Zehnder modulators and/or electro-absorption modulators and/or switches which are switchable by optical signals.

In one embodiment, the switch switchable by optical signals can comprise a filter for passing a turn-off wavelength in the branching line and an absorption dye in the branching line, wherein the impinging of an optical signal with the turn-off wavelength, passed by the filter, has the effect that the absorption dye becomes opaque.

In a further embodiment of the device according to the invention, at least one of the switches which can be switched by optical signals comprises a branch in the branching line, wherein a filter for passing a turn-off wavelength, a photodiode and a Mach-Zehnder modulator are arranged in the branch, wherein an optical signal with the turn-off wavelength, passed by the filter, impinges on the photodiode which generates an electrical voltage which drives the Mach-Zehnder modulator in such a manner that the Mach-Zehnder modulator causes the branching line to be turned off.

The switch or switches switchable by optical signals are preferably arranged in the branching line or in a branch in such a manner that an optical signal flowing from the central cable initiates the switching process. This is made possible, in particular, due to the fact that the filter is always arranged before the other components, that is to say the absorption dye or the photodiode and the Mach-Zehnder modulator, with respect to the branching point in the branching line. In this arrangement, the filter in a switch switchable by optical signals is preferably a CWDM (Coarse Wavelength Division Multiplex) filter and/or a dielectric filter. The CWDM method and corresponding filters therefor are adequately well known from the prior art and will therefore not be described in greater detail in the present application.

In a further embodiment in which switches switchable by optical signals are used, the control device is constructed in such a manner that it generates, and sends out into the central cable, the optical signals having the corresponding turn-off wavelengths. In this manner, various turn-off wavelengths can be generated for the individual branching lines and each branching line can be addressed separately by a signal on the central cable.

Apart from the protection device described above, the invention also relates to a passive optical network comprising a central cable which is split into several optical branching lines at a branching point, the network comprising a protection device according to the invention. In such a network, the central cable of the network preferably extends from an OLT up to the branching point.

In a further embodiment of the network which, in particular, is implemented in combination with a control device with switches switchable by optical signals, the control device is arranged at the OLT, wherein the switching process can be effected by a corresponding optical signal with corresponding turn-off wavelengths in the central cable.

In a further embodiment of the network according to the invention, the branching point is formed by a cable splitter, particularly in the form of a passive optical beam divider. Furthermore, the individual branching lines preferably in each case end at an ONU (Optical Network Unit).

Apart from the device described above and the network described above, the invention also comprises a method for removing signal interference in a passive optical network in which a central optical cable is split into several optical branching lines at a branching point, the following steps being carried out when signal interference occurs in the operation of the passive optical network:
carrying out a first detection by means of which it is detected whether an optical signal tapped off in the central cable and flowing away from the branching point, when one or more branching lines are turned off, is a digital signal level sequence of a multiplicity of signal levels, the level values of which comprise exclusively a predetermined Low level and a predetermined High level, the one or the several temporarily disconnected branching lines being permanently turned off when a digital signal level sequence is detected, and/or carrying out a second detection by means of which it is detected whether an optical signal tapped off in a respective branching line and flowing to the branching point is a digital signal level sequence of a multiplicity of signal levels, the level values of which comprise exclusively a predetermined Low level and a predetermined High level, wherein, in the case where no digital signal level sequence is present, the respective branching line is turned off.

This method according to the invention can be implemented, in particular, by a protection device described above.

In the text which follows, exemplary embodiments of the invention will be explained in detail with reference to the attached figures, in which.

Figure 1:
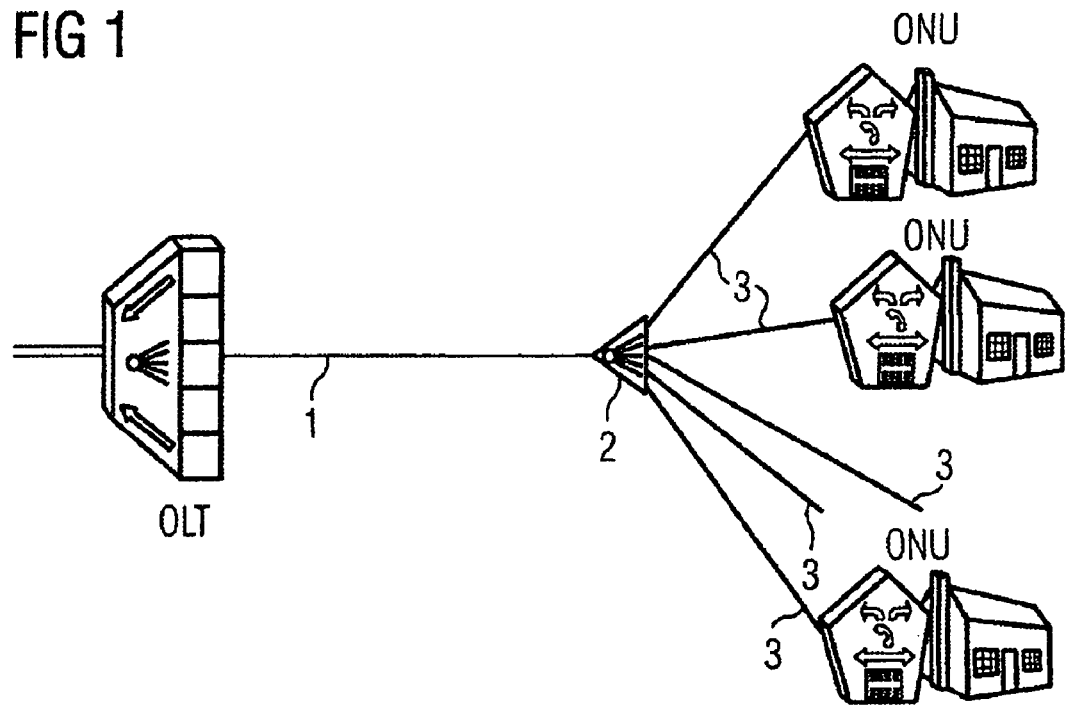
FIG. 1 shows a diagrammatic representation of a conventional passive optical network for illustrating the problem presented according to the invention.

FIG. 1 shows in a diagrammatic representation a conventional passive optical network. The network shown is a so-called metro-access network by which data from a public optical fiber network are distributed to various residences. The optical network comprises a so-called OLT (Optical Line Terminal) as access point, which is sufficiently well known from the prior art and is the transmission interface between the metro-access network and the overlying public optical backbone fiber network.

In the embodiment of the optical network described here, digital data, particularly data packets from the Internet or data from multimedia services, are transmitted via the OLT from the backbone network to the residences or in the reverse direction from the residences to the backbone network. The OLT is connected to a central cable 1 in the form of an optical fiber cable, digital data in the form of optical signals being transmitted via this cable with the aid of corresponding multiplexing methods. The central cable 1 is followed by a cable splitter 2 which is a passive optical distributor and assigns the signals from the central cable 1 to corresponding optical branching lines 3. To each of these branching lines, a corresponding subscriber is connected who represents an ONU (Optical Network Unit) in the passive optical network. In FIG. 1, for example, five branching lines 3 are shown, only three ONUs being reproduced for the purpose of a clearer representation. Nevertheless, a corresponding ONU is connected to each branching line.

In the network shown in FIG. 1, the data are transmitted in such a manner that an overall optical signal is sent in the cable 1 from the OLT to the individual ONUs, each individual ONU responding only to the data which are addressed to it. By comparison, the data are transmitted from the ONUs to the OLT in such a manner that a time slot during which the ONU is sending and all other ONUs must be inactive is allocated to a respective ONU.

In the passive optical network of FIG. 1, the problem exists that due to the common access fiber 1 for all ONUs and the type of multiplexing for the individual ONUs, interference in a single ONU can lead to the failure of the entire optical network. If, for example, laser light on the transmission wavelength is irradiated either accidentally or due to a technical fault in an ONU, this makes the optical signal transmitted on the central cable 1 to the OLT unusable since the digital information transmitted with the signal is destroyed by the laser light. The metro-access network thus becomes unusable for all ONUs. Previous passive optical networks process optical signals for 32 ONUs but in future, passive optical networks will also be used in which the number of ONUs is 1024. This greatly increases the risk of unintentional or intentional network failure in future networks.

According to the prior art, the signal interference in the network of FIG. 1, described above, can only be eliminated by the fact that a service technician drives to the corresponding branching point 2 and successively separates all fiber lines of the individual ONUs until the fiber causing the fault has been found. This method is very time-consuming and difficult since it is not always easy to access the fiber divider 2.

Figure 2:
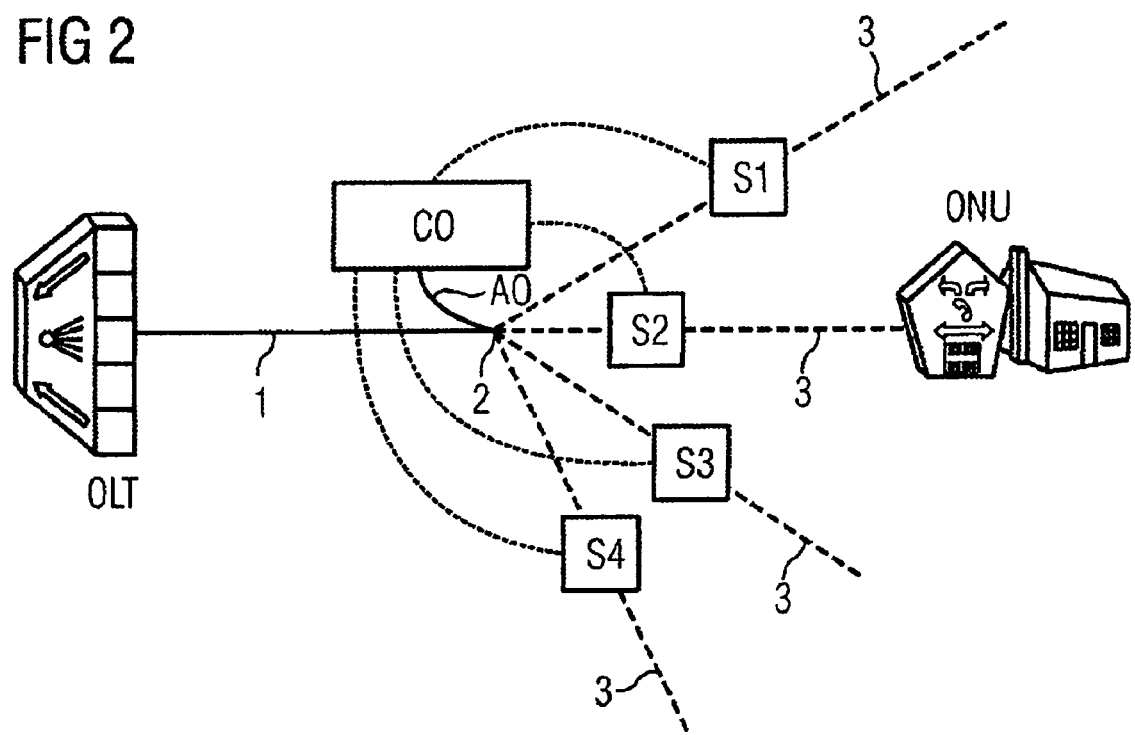
FIG. 2 shows a diagrammatic representation of a passive optical network which contains a protection device according to a first embodiment of the invention.

FIG. 2 shows a first embodiment of a passive optical network which contains a protection device by means of which the problems described above are solved. The optical network of FIG. 2 essentially has the same configuration as the network of FIG. 1. To clarify this, branching lines 3 were indicated as dashed lines and the optical distributor 2 is only reproduced as node. The protection device used in FIG. 2 comprises a multiplicity of optical switches, an optical switch being understood to be a switch by means of which optical signals can be turned off in an optical line. Each branching line 3 has a single optical switch S1, S2, S3 and S4. These optical switches are controlled via a common control device C0, the controlling of the switches via this control device being indicated via corresponding dotted lines.

In the embodiment of FIG. 2 signal interference is detected by a single tap A0 in the central cable 1. Via this tap, the overall signal in cable 1, flowing from the distributor to the OLT and transmitted on a predetermined carrier frequency is detected. Due to the fact that digital data are sent out in different time slots by the ONUs, the overall signal, in correct operation, is a digital signal to which a predetermined Low level for transmitting the digital zero state and a predetermined High level for transmitting the digital one state is allocated. The control device C0 first detects whether the signal in the central cable corresponds to such a digital signal. If it is found that such a signal is not present, the control device C0 looks for the corresponding source of the fault as will be explained in greater detail in the text which follows.

Signal interference can occur in the network of FIG. 2, for example if an interferer sends out a continuous-light signal in an ONU. In this case, the controller C0 detects that the overall signal never drops to the Low level and thus does not correspond to a digital signal. In addition, such interference is detected in which an interferer in an ONU sends modulated light only in the time slots in which a correctly operating ONU is also allowed to send. In this case, the control unit C0 finds that the signal, apart from the Low level and the predetermined High level, has a further level which is produced by the superposition with the interference signal on the predetermined High level. In this case, too, the control device C0 finds that there is no digital signal present.

To eliminate the signal interference, each branching line 3 is successively turned off via the corresponding switches S1, S2, S3 and S4, respectively, in the embodiment of FIG. 2. In this arrangement, the turn-off time is selected to be very short and, in particular, is less than 10 ms. However, the turn-off time is just great enough that the signal in the central cable 1 can be detected with the branching line turned off. When turning off a branching line, the control device C0 checks whether the signal interference is now eliminated, that is to say whether a digital signal is present again on the central cable. If this is the case, it has been possible to identify the corresponding turned-off branching line as interference line at the end of which an ONU with interference is located. Following this, the corresponding interfering line is permanently turned off via the corresponding optical switch by the controller C0. Following this, service personnel can be sent to the disturbed ONU in order to eliminate the interference in the ONU. The remaining metro-access network, however, operates again after a short interruption of a few seconds and the failure of the link is not even detected depending on the type of data traffic.

In general, the protection device according to the invention, which comprises a common control device C0 and optical switches S1 to S4 in the embodiment of FIG. 2, only consumes very little current and can be fed, for example, by solar panels or battery if no power supply is available at the branching point 2 at which the control device is usually integrated.

Figure 3:
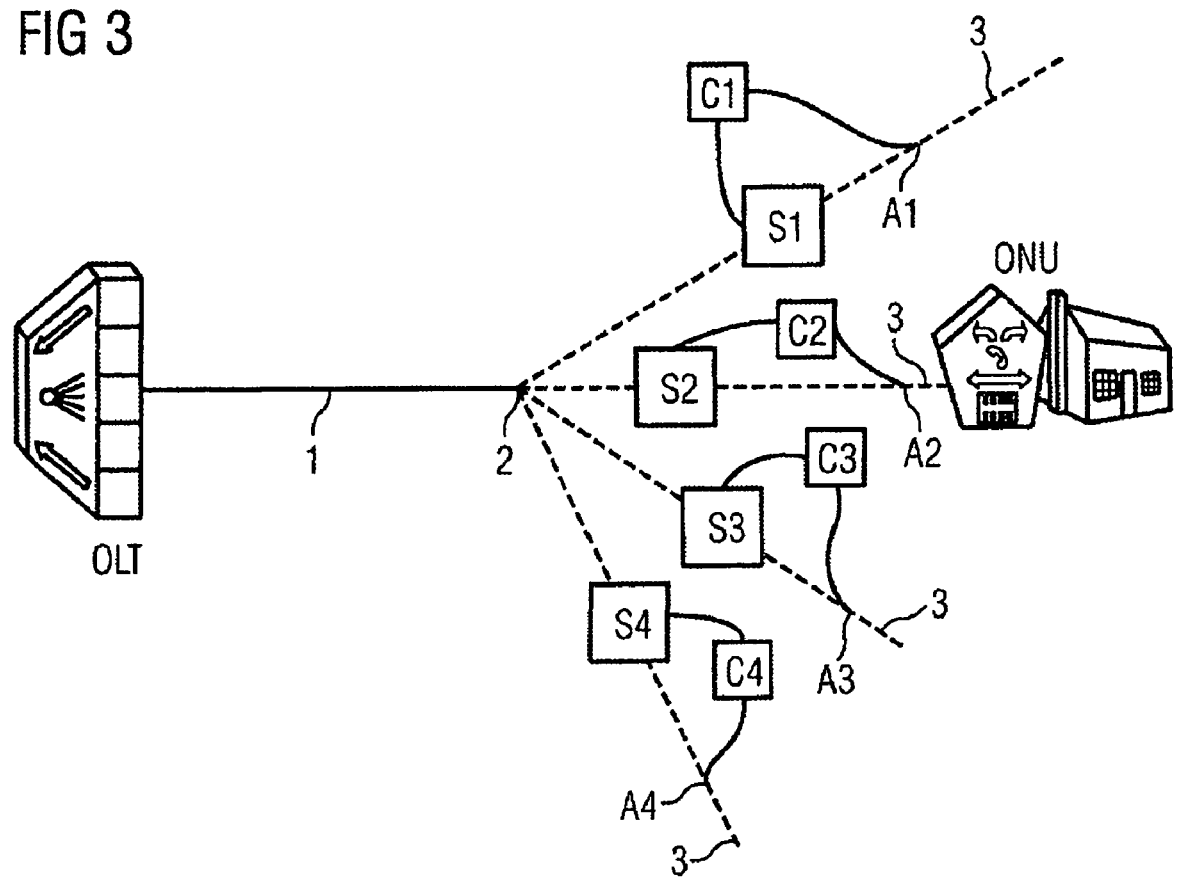
FIG. 3 shows a diagrammatic representation of a passive optical network which contains a protection device according to a second embodiment of the invention.

FIG. 3 shows a passive optical network having the same configuration as in FIG. 2. However, this optical network uses a different embodiment of a protection device according to the invention. Analogously to FIG. 2, this protection device has switches S1, S2, S3 and S4 in each branching line 3. In contrast to FIG. 2, however, the individual switches are controlled separately via corresponding control units C1, C2, C3 and C4. The control device is thus formed by these decentralized control units C1 to C4. Each of the control units in this case taps off the signal in the corresponding branching line 3 via a corresponding tap A1, A2, A3 and A4, respectively. The signal tapped off passes via corresponding lines to the control units C1 to C4, the individual control units controlling the switch in dependence on the signal tapped off via corresponding lines between the respective control unit and the switch. In this arrangement, the control units are constructed in such a manner that, in the case where the signal tapped off does not represent a digital signal level sequence, they cause the corresponding switch to be turned off. As has already been described above, a digital signal level sequence is only present when the individual signals in the signal sequence can assume only two different values, namely a predetermined Low level and a predetermined High level.

In FIG. 3, the individual control units C1 to C4 can be used for detecting interference which is caused, for example, by sending out continuous light on the carrier frequency in a branching line. In this case, the signal in the corresponding branching line never drops back to the Low level.

Figure 4:
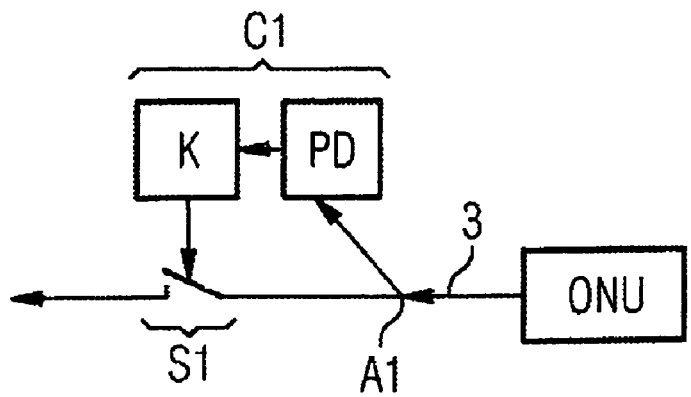
FIG. 4 shows a detailed view of the controls for turning-off the branching lines, used in the embodiment of FIG. 3.

FIG. 4 shows a simple possibility of a passive implementation for a control unit C1, C2, C3 and C4 in a respective branching line 3. In FIG. 4, this possible implementation is shown for the control unit C1 and the control units C2 to C4 can be constructed in the same manner. The implementation of the control unit C1 shown in FIG. 4 is used for detecting interference in which continuous light is sent by an interferer from the ONU into the corresponding branching line 3.

For this purpose, the control unit C1 comprises a photodiode PD which receives the optical signal tapped off from the tap A1. On the basis of the signal tapped off, the photodiode PD generates a current which charges up a capacitor K, there also being provided a discharge resistor (not shown) via which the capacitor K is discharged again with time. The voltage generated by the capacitor K is used for controlling the corresponding switch S1. If the charge, and thus the voltage of the capacitor K, is large enough, this leads to the switch S1 opening and thus to the turning-off of the branching line. To detect continuous light sent out, the photodiode PD, the capacitor K and the switch S1 are matched to one another in such a manner that the normal sending of light during the time slots allocated to the ONU on the branching line 3 does not cause the capacitor K to be adequately charged up for generating a voltage which causes the switch S1 to open. The reason for this is that between the time slots at which no signal is sent, the capacitor K can discharge again. If, in contrast, continuous light is now sent into the branching line 3, the capacitor K is charged up via the photodiode PD to such an extent that the voltage generated is sufficient for opening the switch S1 and turning off the branching line 3. The switch can then be set to normal operation either manually by a service technician or automatically (reverted switch).

The embodiment of FIG. 4 thus shows a very simple possibility of implementing a protection device according to the invention which only consists of passive components and does not need its own power supply.

The optical switches used in the preceding embodiments for turning off the branching lines can be arbitrary switches. In particular, switches known from the prior art, for example mechanical piezoelectric switches, Mach-Zehnder modulators or electro-absorption modulators can be used. However, it is also possible to use novel switches, the structure of which is shown in FIG. 5 and FIG. 6, respectively.

Figure 5:
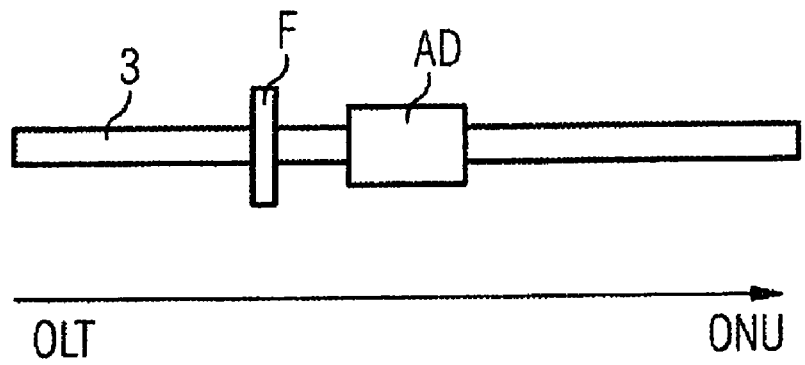
FIG. 5 and FIG. 6 show two embodiments of optical switches which can be used in the protection device according to the invention.
Figure 6:
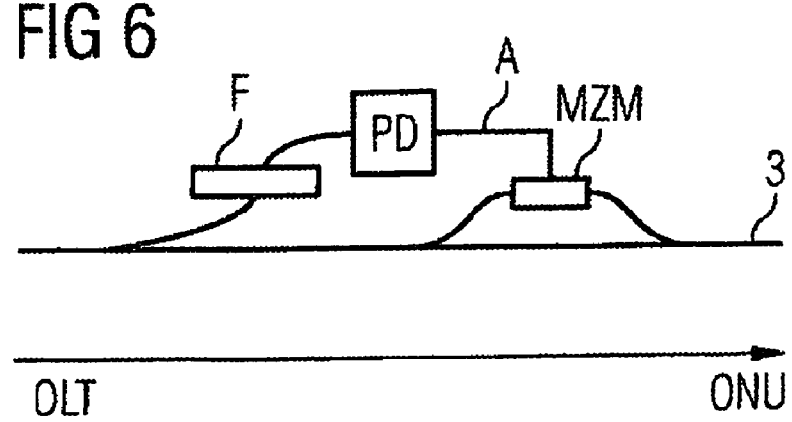

The two switches in FIG. 5 and FIG. 6 have in common that they are switched by optical signals in the optical fiber lines, the optical signals being sent out in the direction of the individual ONUs. For this reason, the embodiments of FIG. 5 and FIG. 6 are suitable, particularly in the implementation of a protection device, the control device of which is arranged remotely from the branching point 2, particularly in the OLT. This is because, in this case, it is possible that the turn-off signals are sent as optical signals having the corresponding turn-off wavelength into the central cable 1 and pass from there to the corresponding optical switches.

So that the components of such optical switches remain cost-effective, so-called CWDM (Coarse Wavelength Division Multiplex) techniques are preferably used for generating turn-off signals with corresponding wavelengths. In these techniques, wavelengths are used as turn-off wavelengths which have a wavelength spacing of at least 20 nm to one another so that the turn-off signals can be filtered out in the individual optical switches via cost-effective optical filters. The number of turn-off signal wavelengths is limited, however, in the CWDM technique so that implementations are also conceivable in which an entire group of branching lines is turned off with a turn-off wavelength. Such a variant represents a compromise between the cost to be expended and the achievable reliability of the optical network.

The variant of an optical switch shown in FIG. 5 comprises a CWDM filter F and an absorption dye AD in the corresponding branching line 3. The CWDM filter here represents a dielectric filter which only passes the telecommunication wavelengths for the transmission of data between OLT and ONU and a single selected turn-off wavelength. To turn off the branching line 3, the control device sends a signal with the turn-off wavelength from the OLT via the branching point 2 into the branching lines 3. The signal with the turn-off wavelength is passed by the filter F and impinges on the absorption dye AD. This absorption dye is arranged in such a manner that it becomes opaque when light impinges with the turn-off wavelength, and thus turns off the optical fiber access.

FIG. 6 shows a further possible implementation of a switch which is switchable by optical signals. In this arrangement, the components of the switch are arranged in a branch A of the branching line 3. They comprise a filter F, a photodiode PD and a Mach-Zehnder modulator MZM. The filter F is again a CWDM filter which, however, passes only one turn-off wavelength. If the control device now sends light having the turn-off wavelength into the line 3, the light passes via the filter F to a downstream photodiode PD which, as a result, generates a voltage which, in turn, drives the Mach-Zehnder modulator MZM which optically turns off the branching line 3. Since in the static case, a Mach-Zehnder modulator only needs a voltage but no electrical power, the voltage generated by the photodiode is sufficient for causing the branching line 3 to be turned off. As already mentioned above, the embodiments of optical switches in FIG. 5 and FIG. 6 have the advantage that the control device can also be arranged remotely from the branching point or the optical switches since the optical switches are controlled via an optical signal fed in with the corresponding turn-off wavelength.

The invention claimed is:

1. A protection device for removing signal interference in a passive optical network in which a central optical cable is split into several optical branching lines at a branching point, comprising:

a plurality of taps, wherein a tap is in each case provided in at least some of the branching lines in order to tap off an optical signal flowing in the respective branching line to the central cable;

a plurality of switches, wherein a switch is in each case provided in at least some of the branching lines in order to turn off the respective branching line;

a control device configured to, when signal interference occurs in the operation of the passive optical network, carry out a detection of whether the optical signal tapped off by the tap in a respective branching line is a digital signal level sequence of a multiplicity of signal levels, the level values of which exclusively are a predetermined Low level and a predetermined High level, wherein the switch in the respective branching line turns off the respective branching line in the case where there is no digital signal level sequence;

said control device including, in at least some of the branching lines, in each case a converter device arranged at the tap for converting light energy of the tapped-off optical signal into electrical voltage for controlling the switch in the respective branching line, wherein the converter device carries out the detection in such a manner that, in the case where the optical signal tapped off is not a digital signal level sequence, the voltage generated by the converter device assumes a value which causes the switch in the respective branching line to be turned off; and said converter device further including a photodiode and a capacitor which interact in such a manner that the photodiode, when receiving light energy from the tapped-off optical signal, charges the capacitor, the switch in the respective branching line being turned off by the charge of the capacitor when the charge of the capacitor is adequate.

2. The device as claimed in claim 1, wherein the control device is configured that when the detection is carried out, individual branching lines and/or combinations of several branching lines are successively turned off for a predetermined period of time.

3. The device as claimed in claim 2, in which the predetermined period of time is 10 ms or less.

4. The device as claimed in claim 1, in which the turning-off of the switch in the respective branching line is effected when the optical signal tapped off is a continuous-light signal.

5. The device as claimed in claim 1, in which the switches in the branching lines include at least one of: piezoelectric switches, Mach-Zehnder modulators, electro-absorption modulators, switches which are switchable by optical signals.

6. The device as claimed in claim 5, in which at least one of the switches which can be switched by optical signals comprises a filter for passing a turn-off wavelength in the branching line and an absorption dye in the branching line, wherein the impinging of an optical signal with the turn-off wavelength, passed by the filter, on the absorption dye has the effect that the absorption dye becomes opaque.

7. The device as claimed in claim 5, in which at least one of the switches which can be switched by optical signals comprises a branch (A) in the branching line, wherein a filter for passing a turn-off wavelength, a photodiode and a Mach-Zehnder modulater are arranged in the branch, wherein an optical signal with the turn-off wavelength, passed by the filter, impinges on the photodiode which thereupon generates an electrical voltage which drives the Mach-Zehnder modulator in such a manner that the Mach-Zehnder modulator causes the branching line to be turned off.

8. The device as claimed in claim 5, wherein the switch or switches which can be switched by optical signals can be switched by an optical signal flowing from the central cable.

9. The device as claimed in claim 5, in which the filter in a respective switch which can be switched by optical signals is a CWDM filter or a dielectric filter.

10. The device as claimed in claim 6, wherein the control device is constructed in such a manner that it generates, and sends out into the central cable, the optical signals having the corresponding turn-off wavelengths.

11. The device as claimed in claim 3, in which the predetermined period of time is 10 ms or less.

12. A passive optical network comprising a central cable which is split into several optical branching lines at a branching point, the network including a device as claimed in claim 1.

13. The network as claimed in claim 12, wherein the central cable of the network extends from an OLT up to the branching point.

14. The network as claimed in claim 12, in which the control device is arranged at the OLT.

15. The network as claimed in claim 12, wherein the branching point is formed by a cable splitter, particularly in the form of a passive optical beam divider.

16. The network as claimed in claim 12, in which the branching lines in each case end at an ONU.

17. A protection device for removing signal interference in a passive optical network in which a central optical cable is split into several optical branching lines at a branching point, comprising:
a first tap and a plurality of second taps, wherein a second tap is in each case provided in at least some of the branching lines in order to tap off an optical signal flowing in the respective branching line to the central cable, and wherein the first tap is provided in the central cable to tap off an optical signal flowing in the central cable in the direction away from the branching point; and
a plurality of switches, wherein a switch is in each case provided in at least some of the branching lines in order to turn off the respective branching line;
wherein
the protection device includes a control device which is constructed in such a manner that, when signal interference occurs in the operation of the passive optical network,
a detection is carried out by detecting whether the optical signal tapped off by the first tap, while one or more branching lines is/are temporarily turned off, is a digital signal level sequence from a multiplicity of signal levels, the level values of which comprise exclusively a predetermined Low level and a predetermined High level, wherein the switch or the switches in the one or more branching lines temporarily turned off permanently turn off the one or the several branching lines when a digital signal level sequence is detected,
the control device includes in at least some of the branching lines in each case a converter device arranged at the second taps for converting light energy of the tapped-off optical signal into electrical voltage for controlling the switch in the respective branching line, wherein the converter device is arranged such that, in the case where the one or more branching lines is to be turned off permanently, the voltage generated by the converter device assumes a value which causes the switch in the respective branching line to be turned off; and the converter device includes a photodiode and a capacitor which interact in such a manner that the photodiode, when receiving light energy from the tapped-off optical signal, charges the capacitor, the switch in the respective branching line being turned off by the charge of the capacitor when the charge of the capacitor is adequate.

18. The device as claimed in claim 17, in which the control device is constructed in such a manner that when the detection is carried out, individual branching lines and/or combinations of several branching lines are successively turned off for a predetermined period of time.

19. The device as claimed in claim 17, in which the turning-off of the switch in the respective branching line is effected when the optical signal tapped off is a continuous-light signal.

20. The device as claimed in claim 17, in which the switches in the branching lines include at least one of: piezoelectric switches, Mach-Zehnder modulators, electro-absorption modulators and switches which are switchable by optical signals.

21. The device as claimed in claim 20, in which at least one of the switches which can be switched by optical signals includes a filter for passing a turn-off wavelength in the branching line and an absorption dye in the branching line, wherein the impinging of an optical signal with the turn-off wavelength, passed by the filter, on the absorption dye has the effect that the absorption dye becomes opaque.

22. The device as claimed in claim 20, in which at least one of the switches which can be switched by optical signals includes a branch in the branching line, wherein a filter for passing a turn-off wavelength, a photodiode and a Mach-Zehnder modulater are arranged in the branch, wherein an optical signal with the turn-off wavelength, passed by the filter, impinges on the photodiode which thereupon generates an electrical voltage which drives the Mach-Zehnder modulator in such a manner that the Mach-Zehnder modulator causes the branching line to be turned off.

23. The device as claimed in claim 20, wherein the switch or switches which can be switched by optical signals can be switched by an optical signal flowing from the central cable.

24. The device as claimed in claim 20, in which the filter in a respective switch which can be switched by optical signals is a CWDM filter or a dielectric filter.

25. The device as claimed in claim 21, wherein the control device is constructed in such a manner that it generates, and sends out into the central cable, the optical signals having the corresponding turn-off wavelengths.

26. A method for removing signal interference in a passive optical network in which a central optical cable is split into several optical branching lines at a branching point, the following steps being carried out when signal interference occurs in the operation of the passive optical network:

carrying out at least one of:
- a first detection by means of which it is detected whether an optical signal tapped off in the central cable and flowing away from the branching point, when one or more branching lines are temporarily turned off, is a digital signal level sequence of a multiplicity of signal levels, the level values of which comprise exclusively a predetermined Low level and a predetermined High level, the one or the several temporarily disconnected branching lines being permanently turned off when a digital signal level sequence is detected, and
- a second detection by means of which it is detected whether an optical signal tapped off in a respective branching line and flowing to the central cable is a digital signal level sequence of a multiplicity of signal levels, the level values of which comprise exclusively a predetermined Low level and a predetermined High level, wherein, in the case where no digital signal level sequence is present, the respective branching line is turned off;

converting light energy of an optical signal tapped-off in at least some of the branching lines into electrical voltage for controlling a switch in the respective branching line, such that, in the case where the one or more branching lines are to be turned off permanently, the voltage generated assumes a value which causes the switch in the respective branching line to be turned off; and with a photodiode, charging a capacitor when receiving light energy from the tapped-off optical signal, causing the switch in the respective branching line to be turned off by the charge of the capacitor when the charge of the capacitor is adequate.

* * * * *